May 7, 1940.  E. BUSH  2,200,153
DIFFERENTIAL
Filed Aug. 2, 1938  2 Sheets-Sheet 1
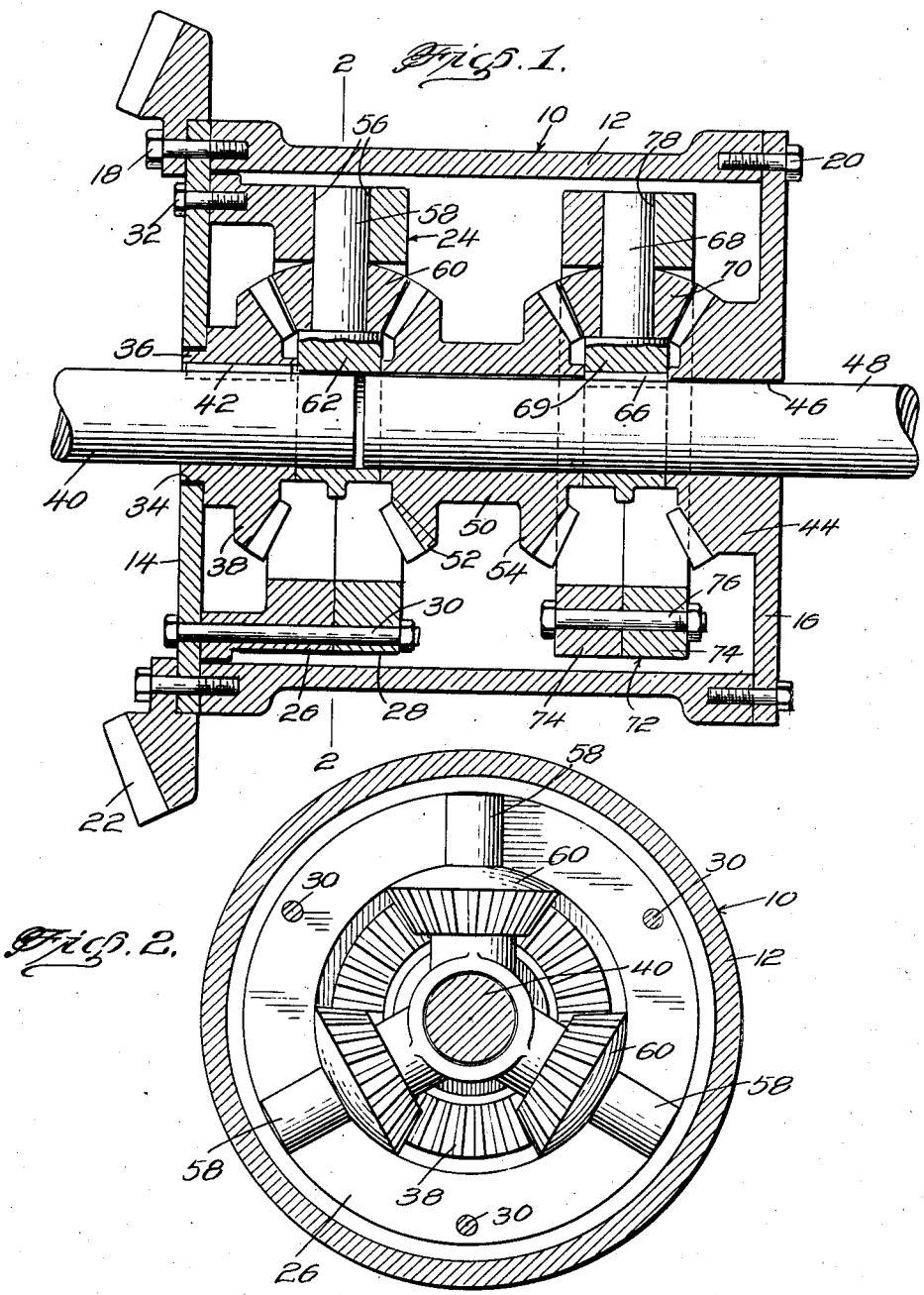
Earl Bush INVENTOR
BY Victor J. Evans & Co.
ATTORNEYS May 7, 1940.  E. BUSH  2,200,153
DIFFERENTIAL
Filed Aug. 2, 1938   2 Sheets-Sheet 2
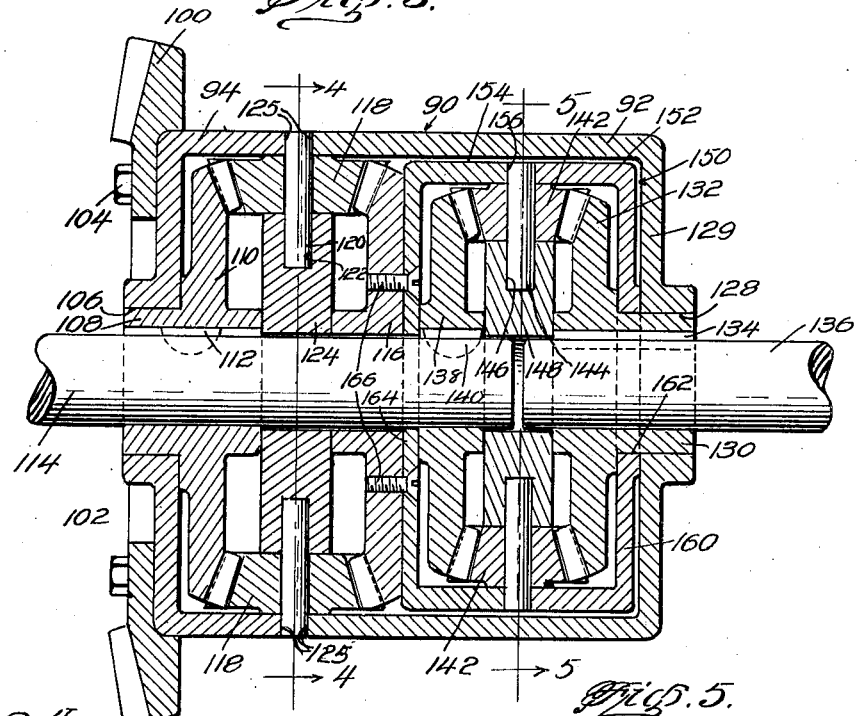
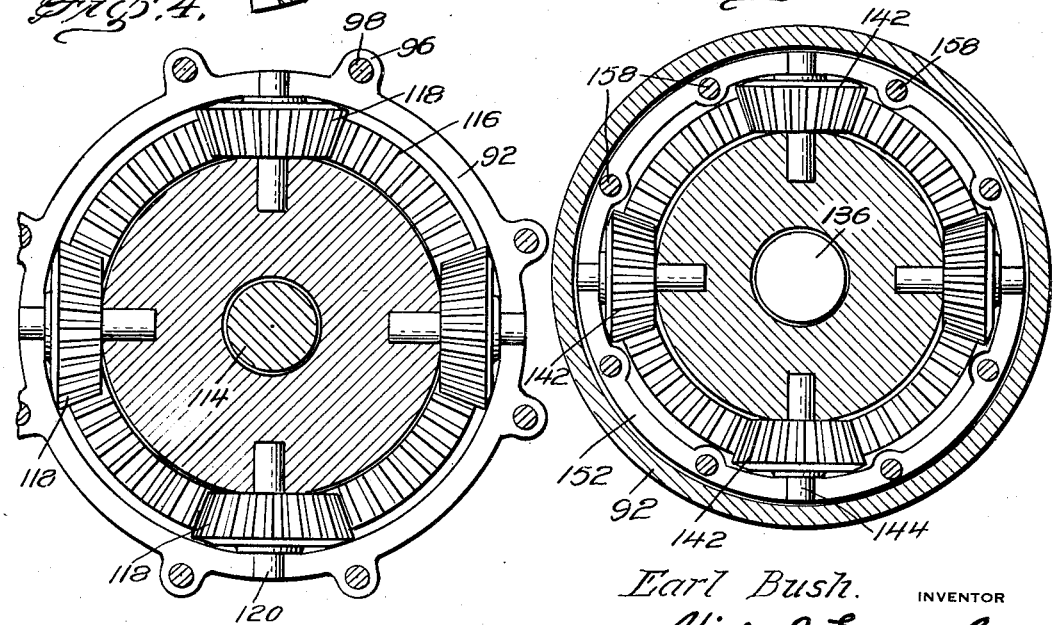
Earl Bush, INVENTOR
BY Victor J. Evans & Co.
ATTORNEYS Patented May 7, 1940

2,200,153

UNITED STATES PATENT OFFICE 2,200,153

DIFFERENTIAL

Earl Bush, Fern, Wis.

Application August 2, 1938, Serial No. 222,706

2 Claims. (Cl. 74—311)

My invention relates to the transmission of power and has among its objects and advantages the provision of an improved differential mechanism designed to proportion power between multiple power take-offs.

In trucks of the four-wheel drive type and other machinery, it is frequently highly desirable to distribute power unevenly with respect to the front and rear traction wheels. In such trucks, as well as other types of machinery employing a differential and multiple power take-offs, it is important that the distribution of power be divided in proportion to the demands of the individual power take-offs. As an example, in trucks of the four-wheel drive type the rear wheels may be characterized by a greater tractive capacity, but if the power is evenly divided between the front and rear tractive wheels, the power is unevenly divided to the degree where the rear tractive wheels will be underpowered and the front tractive wheels overpowered. It is, therefore, an object of the present invention to provide a differential for connection with a multiple power take-off system in which the differential is so constructed as to proportionately divide the power on the basis of the work performed by the individual power take-offs.

In the accompanying drawings:

Figure 1 is a longitudinal sectional view of a differential constructed according to my invention;

Figure 2 is a sectional view along the line 2—2 of Figure 1;

Figure 3 is a sectional view of a different form of my invention;

Figure 4 is a sectional view along the line 4—4 of Figure 3; and

Figure 5 is a sectional view along the line 5—5 of Figure 3.

In the embodiment selected to illustrate my invention, I make use of a differential housing 10 including a cylindrical body 12 and end plates 14 and 16. Plates 14 and 16 are connected with the ends of the body 12 by bolts 18 and 20, respectively. To one end of the differential housing 10 I connect a bevel gear 22 which is made secure by the bolts 18. Bevel gear 22 is driven in the manner of conventional differential drives.

To the inner face of the plate 14 I mount a case 24 which is made up of sections 26 and 28. Sections 26 and 28 are connected into a unitary structure by bolts 30, which bolts also extend through the plate 14 for anchoring the case 24 thereto. Bolts 32 are also employed for additionally anchoring the case 24 to the plate 14.

Plate 14 includes an opening 34 for accommodating the hub 36 of a gear 38 keyed to a shaft 40, as at 42. Plate 16 is provided with a fixed gear 44 having an opening 46 for loosely receiving the shaft 48. Upon the shaft 48 I mount a collar 50 which is formed integrally with gears 52 and 54. Collar 50 is loosely related to the shaft 48.

Sections 26 and 28 are recessed at 56 to define openings for the reception of shafts 58 upon which pinions 60 are mounted and arranged in mesh with the gears 38 and 52. Shafts 58 are attached to and project radially from a ring 62 which loosely embraces the shafts 40 and 48. Upon the shaft 48 I mount a ring 69 which is keyed to the shaft, as at 66. Ring 69 carries shafts 68 upon which gears 70 are mounted and arranged in mesh with the gears 54 and 44. The outer ends of the shafts 68 are supported by a ring 72 made up of sections 74 connected into a unitary structure by bolts 76. Sections 74 are recessed at 78 to define openings for connection with the shafts 68, but the ring 72 is of a floating nature and is effective for holding the gears 70 in mesh with the gears 54 and 44.

Shafts 40 and 48 constitute power take-offs for operating different units such as the rear and front wheels of a four-wheel drive. Power applied to the transmission case 10 through the medium of the gear 22 is transmitted to the case 24. Such power is transmitted to the gears 60 and is divided equally between the gears 38 and 52. Gear 36 is keyed to the shaft 40, while gears 52 and 54 operate as a single unit. However, the gears 52 and 54 ride freely on the shaft 48 because of the loose relation between the collar 50 and the shaft. Thus the integral relation between the gears 52 and 54 transmits power from the gears 60 to the gears 70. Gear 44 constitutes an anchor gear for one side of the gears 70 and is attached to the plate 16 as a part thereof. Thus power applied or transmitted to the ring 64 will be twice as much as the power applied to the shaft 40. Thus the shaft 48 will perform heavy duty service.

In Figures 3, 4 and 5 I illustrate a different form of my invention. The differential housing 90 is made up of sections 92 and 94 each having ears 96 bored for the reception of bolts 98 for connecting the sections into a unitary structure. A gear 100 is attached to the end 102 of the section 94 through the medium of bolts 104. Wall 102 includes an opening 106 for accommodating the hub 108 of the gear 110. This gear is keyed at 112 to a power shaft 114, which may be connected with machinery to be operated.

Upon the shaft 114 I loosely mount a gear 116. Between the gears 110 and 116 I mount pinions 118. These pinions are loosely mounted on shafts 120 having their inner ends located in bores 122 in a ring 124 mounted loosely on the shaft 114. The outer ends of the shafts 120 lie in recesses 125 in the sections 92 and 94 and are clamped therein as the sections 92 and 94 are drawn into fixed, end to end relation by the bolt 98.

The wall 126 of the section 92 is provided with an opening 128 for accommodating the hub 130 of a gear 132. Gear 132 is keyed at 134 to a power shaft 136 which may be connected with the second unit of the machinery to be operated. To the shaft 114 I key a gear 138, as at 140. Between the gears 132 and 138 I mount pinions 142. These pinions are rotatably mounted on shafts 144 having their inner ends located in bores 146 in a ring 148 loosely encircling both shafts 114 and 136. Gears 132, 138 and the pinions 142 are enclosed within a case 150 comprising sections 152 and 154. These sections are recessed at 156 for receiving the outer ends of the shafts 144 which are made secure when the sections 152 and 154 are clamped together by bolts 158. The wall 160 of the housing 150 is provided with an opening 162 for the reception of the hub 130. I fixedly relate the wall 164 of the housing 150 to the gear 116 by bolts 166.

Housing 150 and the gear 116 are freely related to the shaft 114 and cause half the power to be divided between the gears 138 and 132. As one-half of the applied power is direct to the shaft 114, the other half is divided again equally between the shafts 114 and 136. Thus the shaft 114 will receive seventy-five per cent of the power while the shaft 136 will receive twenty-five per cent of the power.

Without further elaboration, the foregoing will so fully illustrate my invention, that others may by applying current knowledge readily adapt the same for use under various conditions of service.

I claim:

1. In combination with a differential housing including means for driving the same, a pair of power shafts extending into the differential housing, a gear keyed to one of said power shafts, an operating connection between said gear and said differential housing, a gear fixed to the differential housing, pinions arranged in mesh with said second-named gear, an operating connection between said pinions and said first operating connection, and means keyed to the said other of the power shafts for rotatably supporting said pinions.

2. A device of the type described comprising a differential housing including means for driving the same, a first shaft extending into the differential housing, a second shaft extending into the differential housing, a gear keyed to the first shaft, two integrally connected gears loosely mounted on the second shaft, pinions between said first gear and one of said pair of integrally connected gears, a driving connection between said pinions and the differential housing, a gear fixedly related to the differential housing, pinions between said last gear and the other of said pair of integrally connected gears, and pivots fixedly related to the second shaft for rotatably mounting said last-named pinions, said gears and said pinions being so constructed and arranged as to divide power unevenly between said first and said second shafts.

EARL BUSH.